(12) United States Patent
Su

(10) Patent No.: US 10,235,905 B2
(45) Date of Patent: Mar. 19, 2019

(54) AUTOMATIC INJECTION TRAINING DEVICE

(71) Applicant: CAREBAY EUROPE LTD, Sliema (MT)

(72) Inventor: Chia-Hsin Su, New Taipei (TW)

(73) Assignee: SHL MEDICAL AG, Zug (CH)

( * ) Notice: Subject to any disclaimer, the term of this patent is extended or adjusted under 35 U.S.C. 154(b) by 171 days.

(21) Appl. No.: 15/528,148

(22) PCT Filed: Oct. 24, 2015

(86) PCT No.: PCT/EP2015/074686
§ 371 (c)(1),
(2) Date: May 19, 2017

(87) PCT Pub. No.: WO2016/078870
PCT Pub. Date: May 26, 2016

(65) Prior Publication Data
US 2017/0337845 A1 Nov. 23, 2017

(30) Foreign Application Priority Data
Nov. 20, 2014 (SE) ...................................... 1451402

(51) Int. Cl.
*G09B 23/28* (2006.01)
(52) U.S. Cl.
CPC .................. *G09B 23/285* (2013.01)
(58) Field of Classification Search
USPC ........ 434/262, 267, 268, 272; 604/134, 135, 604/192–196
See application file for complete search history.

(56) References Cited

U.S. PATENT DOCUMENTS

| 3,795,061 A | 3/1974 | Samoff et al. |
| 5,071,353 A | 12/1991 | van der Wal |

(Continued)

FOREIGN PATENT DOCUMENTS

| WO | 2011/151315 A1 | 12/2011 |
| WO | 2013/130973 A1 | 9/2013 |

(Continued)

OTHER PUBLICATIONS

International Search Report and Written Opinion for Int. App. No. PCT/EP2015/074686, dated Feb. 1, 2016.

*Primary Examiner* — Kurt Fernstrom
(74) *Attorney, Agent, or Firm* — McDonnell Boehnen Hulbert & Berghoff LLP

(57) ABSTRACT

An automatic injection training device is presented having an elongated housing assembly and a demo container. The device further has a reloadable plunger assembly comprising a hollow plunger, a piston rod, a first energy accumulating member arranged between the hollow plunger and the piston rod and an actuation assembly configured to hold the hollow plunger in a first position and thereby the piston rod in the start position and to release the hollow plunger from the first position and thereby the piston rod from the start position. The hollow plunger can have a chamber sealed by the piston rod, and a passage; such that movement of the hollow plunger from the first to the second position by a force exerted from the first energy accumulating member causes an airflow into the chamber through the passage whereby the movement of the hollow plunger is dampened.

16 Claims, 12 Drawing Sheets

(56) References Cited

U.S. PATENT DOCUMENTS

| | | | | |
|---|---|---|---|---|
| 9,443,445 B2* | 9/2016 | Laurusonis | .......... | G09B 23/285 |
| 9,572,938 B2* | 2/2017 | Julian | .................. | A61M 5/2033 |
| 9,911,364 B2* | 3/2018 | Baker | .................. | G09B 23/285 |
| 10,013,895 B2* | 7/2018 | Swanson | ............... | G09B 23/285 |
| 10,022,501 B2* | 7/2018 | Olson | .................. | A61M 5/2033 |
| 10,052,436 B2* | 8/2018 | Hogdahl | ............. | A61M 5/2033 |
| 10,089,902 B2* | 10/2018 | Baker | .................. | G09B 23/285 |
| 10,127,836 B2* | 11/2018 | Alexandersson | .... | G09B 23/285 |
| 10,130,775 B2* | 11/2018 | Hogdahl | ............. | A61M 5/2033 |

FOREIGN PATENT DOCUMENTS

| | | |
|---|---|---|
| WO | 2014/056868 A1 | 4/2014 |
| WO | 2015/110327 A1 | 7/2015 |

* cited by examiner

AUTOMATIC INJECTION TRAINING DEVICE

CROSS REFERENCE TO RELATED APPLICATIONS

The present application is a U.S. National Phase Application pursuant to 35 U.S.C. § 371 of International Application No. PCT/EP2015/074686 filed Oct. 24, 2015, which claims priority to Swedish Patent Application No. 1451402-0 filed Nov. 20, 2014. The entire disclosure contents of these applications are herewith incorporated by reference into the present application.

TECHNICAL FIELD

The present disclosure relates to automatic injection training devices, i.e. educational appliances or dummies to train individuals in the administration of medication by means of automatic injection devices. More specifically, the present disclosure relates to a training device that simulates the injection of the medicament by an automatic injection device accurately by means of a damper unit, and/or to a training device that has an actuation assembly configured such that the device can be reused easily.

BACKGROUND

Automatic injection devices for delivering active substances (e.g. pen-type injectors) are well known in the art. In many cases, training versions of such devices are required for showing potential users (e.g., patients or healthcare providers) how a device should be employed and for illustrating the advantages of the device. Such devices are frequently called "promotion" or "training" devices. The devices should mimic the function of a corresponding real injection device, but should not be capable of injecting an active substance.

Document U.S. Pat. No. 5,071,353 describes a training device for an automatic injector. The device comprises a cylindrical outer sleeve in the rear position of which a discharge mechanism is connected. The discharge mechanism comprises a plunger, a coil spring which acts on the plunger, a locking device, and a safety member. However, this device does not provide means allowing an accurate simulation of the resistance acting on the discharge mechanism of a regular injection device when an active substance is ejected.

WO 2011/151315 discloses a training cartridge for a drug delivery device as well as a method for resetting the cartridge. The cartridge comprises a body of substantially cylindrical shape, a piston that is slidably disposed in the body in an axial direction, and a closure means disposed at an axial end portion of the body. The piston and the closure means confine an interior volume coupled to the exterior via at least one fluid escape channel. According to the method disclosed, several steps are required for resetting the cartridge.

SUMMARY

The object of the present disclosure is to provide an automatic injection training device that is reliable and easy to use when handling and activating, this is achieved by an automatic injection training device comprising an elongated housing assembly having a distal and an opposite proximal end and a demo container axially and rotationally fixed relative to the elongated housing assembly. The automatic injection training device further comprises a reloadable plunger assembly comprising a hollow plunger which is movable in the demo container between a first and a second position, a piston rod coaxially arranged within the hollow plunger and axially movable in relation to the elongated housing assembly between a start position and a final position, and a first energy accumulating member arranged between the hollow plunger and the piston rod. The automatic injection training device comprises an actuation assembly configured to hold the hollow plunger in a first position and thereby the piston rod in the start position and to release the hollow plunger from the first position and thereby the piston rod from the start position. The training device hollow plunger comprises a chamber sealed by the piston rod, and a passage; such that movement of the hollow plunger from the first to the second position by a force exerted from the first energy accumulating member causes airflow into the chamber through the passage whereby the movement of the hollow plunger is damped.

In an embodiment of the disclosure the automatic injection training device the movement of the hollow plunger is damped by a damping force which is created by a pressure difference between the pressures in the chamber and in the atmosphere when air starts to flow into the chamber.

In a further embodiment of the disclosure the passage is configured to have a certain size such that the airflow is controlled and whereby the pressure difference is balanced. In a preferred embodiment of the disclosure the chamber is configured to have a certain size for defining the stroke length of the hollow plunger. Furthermore, the automatic injection training device comprises a second energy accumulating member arranged between the elongated housing assembly and the piston rod.

According to embodiments of the disclosure, the first and the second energy accumulating members are compression springs and wherein the second energy accumulating member has a high spring constant in relation to the spring constant of the first energy accumulating member, such that when the hollow plunger is released from the first position, the piston rod moves from the start position to the final position by a force exerted from the second energy accumulating member causing an impact of the piston rod against a fixed surface to create and audible feedback signal.

In another embodiment the automatic injection training device actuation assembly comprises an actuator sleeve that is slidably arranged in relation to the elongated housing and operationally associated with a third energy accumulating member such that, the actuator sleeve is axially moveable in relation to the elongated housing assembly towards the distal end from an initial position to a retracted position against an axial force from said third energy accumulating member and/or such that, due to an output axial force from said third energy accumulating member, the actuator sleeve is axially moveable in relation to the elongated housing assembly a predetermined distance towards the proximal end of the device from the retracted position to the initial position.

The actuation assembly in another embodiment of the disclosure, comprises an actuator; wherein the actuator has a resilient portion with a first segment having a first outer diameter and a second segment having a second outer diameter, the second segment being more proximal than the first segment and the second outer diameter being larger than the first outer diameter; and wherein the actuator sleeve overlaps at least part of the second segment and inhibits the resilient portion from moving in a radial outward direction when the actuator sleeve is in the initial position.

The actuator further has a tapering segment between the first segment and the second segment. The movement of the hollow plunger towards the proximal end of the device is substantially inhibited by the at least one resilient portion interacting with the hollow plunger, when the hollow plunger is in the first position and the actuator sleeve is in the initial position. The resilient portion is designed to bend radial outwardly such that the hollow plunger is released, when the hollow plunger is in the first position and the actuator sleeve is in the retracted position.

According to embodiments of the disclosure, the hollow plunger is axially moveable in relation to the elongated housing assembly and/or in relation to the piston rod towards the distal end from the second position to the first position against the axial force from the first energy accumulating member. The actuation assembly further comprises a needle cover that is operationally associated with the actuator sleeve and has a proximal portion that extends outwards of the elongated housing assembly in a proximal direction when the actuator sleeve is in the initial position. The needle cover is connected to a fourth energy accumulating member that urges the needle cover to move distally such that the proximal portion of the needle cover protrudes from the distal end of the elongated housing assembly.

An assembly comprises an automatic injection training device according to the disclosure, wherein a reload cap unit comprises a removable proximal cap having a shaft member that is configured for being introduced into the elongated housing assembly through a proximal opening of the needle cover. In one embodiment of the assembly, the removable proximal cap comprises a first portion with a cup-shaped structure that is configured to accommodate and/or guide the proximal portion of the needle cover that extends outwards of the elongated housing and that is configured to bear against an abutment surface of the elongated housing assembly when the device is reloaded.

The automatic injection training device according to the present disclosure presents a number of advantages. There is a high degree of functionality and automation, which removes unnecessary components and actions for injection simulation.

These and other aspects of and advantages with the present disclosure will become apparent from the following detailed description and from the accompanying drawings.

BRIEF DESCRIPTION OF THE DRAWINGS

In the following detailed description of the disclosure, reference will be made to the accompanying drawings, of which.

DETAILED DESCRIPTION

In the present application, when the term "distal part/end" is used, this refers to the part/end of an automatic injection training device, or the parts/ends of the members thereof, which is/are located the furthest away from the medicament delivery site of the patient. Correspondingly, when the term "proximal part/end" is used, this refers to the part/end of the automatic injection training device, or the parts/ends of the members thereof, which, is/are located closest to the medicament delivery site of the patient.

Figure 1:
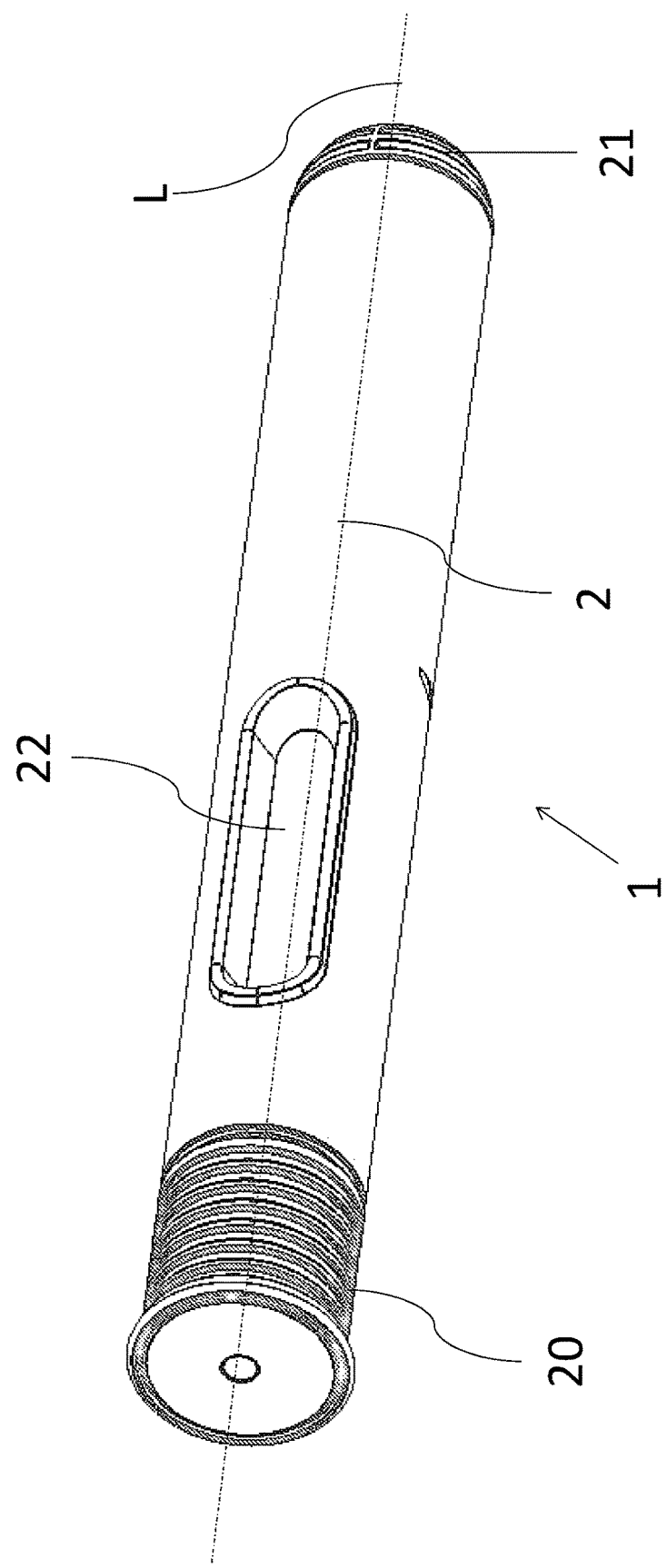
FIG. 1 shows perspective view of one embodiment according to the present disclosure disclosing an automatic injection training device.

In FIG. 1 is shown an assembly 1 comprising an automatic injection training device and a reload cap unit, according to the present disclosure. The automatic injection training device according to the present disclosure may comprise an elongated housing assembly having an elongated housing 2 extending along a longitudinal axis L and a distal cap 21. The elongated housing 2 may be open at the proximal end, which opening can be closed by the reload cap unit which comprises a proximal removable cap 20. The elongated housing 2 may also comprise an inspection window 22 for assessing the position of a hollow plunger 10 which is adapted to simulate a driving plunger/piston in a real medicament delivery device. The elongated housing 2 and the distal cap 21 are axially and rotationally fixed relative to each other by suitable connecting members/means. The elongated housing 2 and the distal cap 21 may be integral but as shown in the present embodiment they are divided into two components for assembly purpose.

Figure 2:
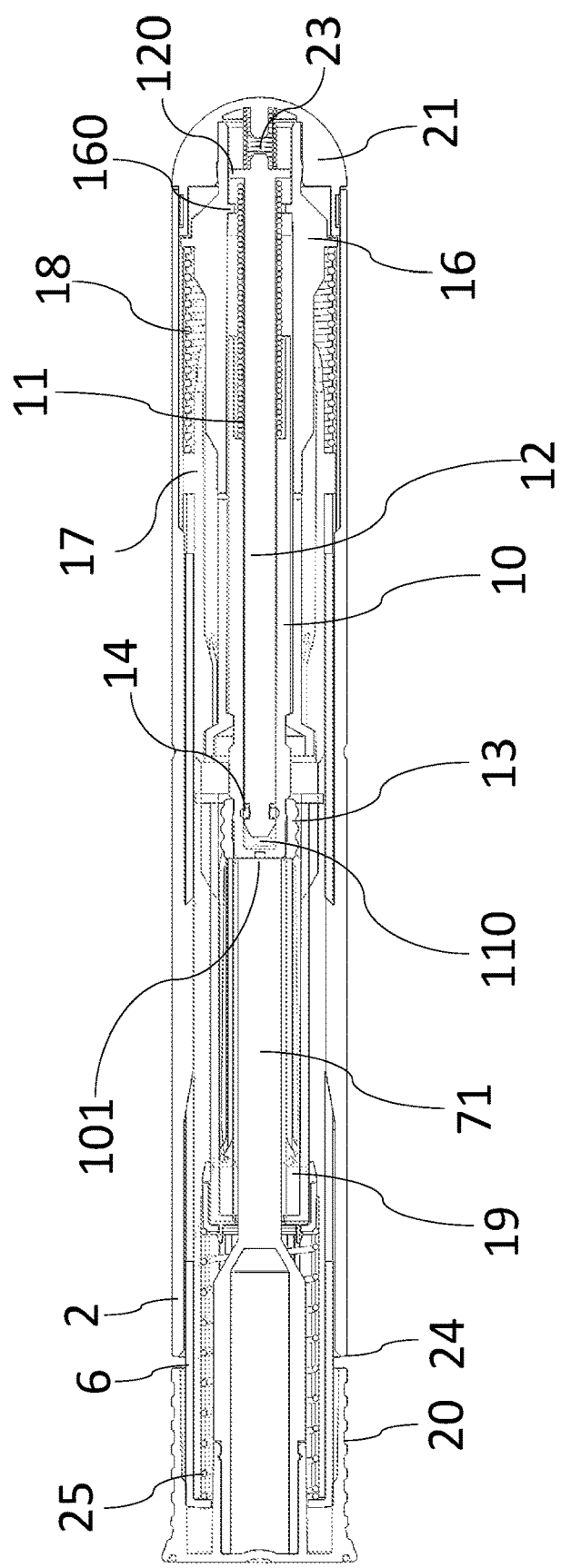
FIG. 2 shows a cross-sectional view of the training device of FIG. 1.

As illustrated in the cross-sectional view of FIG. 2, the automatic injection training device according to the present disclosure may further comprise a demo container 19 axially and rotationally fixed relative to the elongated housing 2; a reloadable plunger assembly comprising the hollow plunger 10 which is movable in the demo container 19 between a first and a second position, a piston rod 12 partially arranged within the hollow plunger 10 and axially movable in relation to the elongated housing assembly between a start position and a final position, a stopper 13, a first energy accumulating member 11 arranged between the hollow plunger 10 and the piston rod 12 for exerting a force and thereby moving the hollow plunger 10; an actuation assembly configured to hold the hollow plunger 10 in a first position and thereby the piston rod 12 in the start position and to release the hollow plunger 10 from the first position and thereby the piston rod 12 from the start position; wherein the hollow plunger 10 comprises a chamber 110, sealed by the piston rod 12 which comprises a seal member 14, and a passage 101; such that movement of the hollow plunger 10 from the first to the second position by the force exerted from the first energy accumulating member 11 (e.g. a compression spring) causes an airflow into the chamber 110 through the passage 101 whereby the movement of the hollow plunger 10 is damped. In the second position the hollow plunger 10 has pushed the stopper 13 to a proximal end of the demo container 19.

Further, the actuation assembly may comprise an actuator 16 and an actuator sleeve 17 and a third energy accumulating member 18 (e.g. a compression spring). The actuator sleeve 17 is slidably arranged in relation to the elongated housing 2 and operationally associated with the third energy accumulating member 18 such that the actuator sleeve 17 is axially movable in relation to the elongated housing 2 towards the distal end from an initial position to a retracted position against an compression force from said third energy accumulating member 18.

Figure 3:
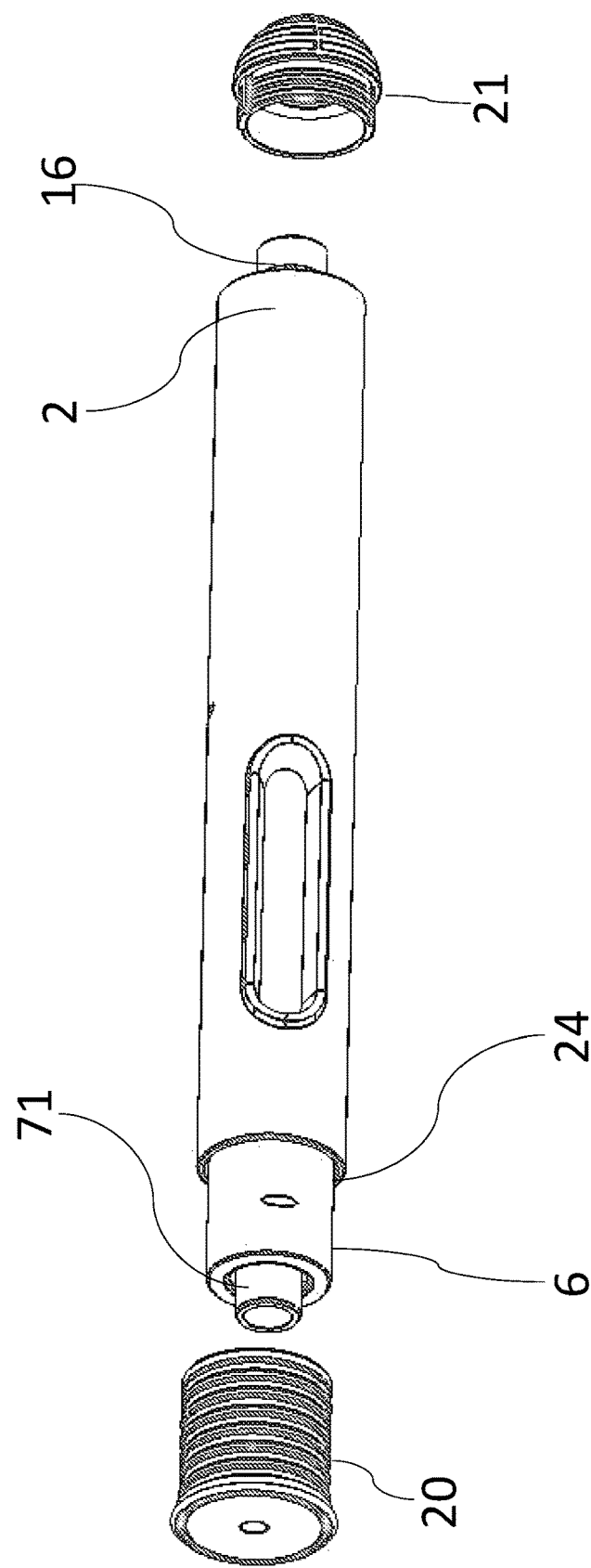
FIG. 3 illustrates an exploded view of the embodiment of FIG. 2, wherein the removable proximal and distal caps are depicted.

As seen in FIGS. 2 and 3, the actuation assembly further comprises a needle cover 6 which is movably arranged in relation to the elongated housing 2, more specifically slidable in relation to the elongated housing 2. A fourth energy accumulating member 25, e.g. a compression spring, is arranged between a proximal annular flange of the needle cover and an inner surface of the elongated housing 2 urging the needle cover towards the proximal end such that a proximal portion of the needle cover is configured to extend from the proximal end of the elongated housing 2 in a proximal direction. The needle cover 6 is configured to be operationally associated with the actuator sleeve 17. When the proximal portion of the needle cover is extended outwards from the proximal end of the elongated housing and the actuator sleeve 17 is in the initial position, there is a predetermined distance between a distal end of the needle cover and a proximal end of the actuator sleeve. It is also seen that the removable proximal cap 20 has a shaft member 71 configured for being introduced into the elongated housing 2 through a proximal opening of the needle cover 6. Further, the removable proximal cap 20 comprises a first portion with a cup-shaped structure that is configured to accommodate and/or guide the proximal portion of the needle cover 6 that extends proximally of the elongated housing 2, and which cup-shaped structure is configured to bear against an abutment surface 24 of the elongated housing 2 when the training device is reloaded.

Figure 4:
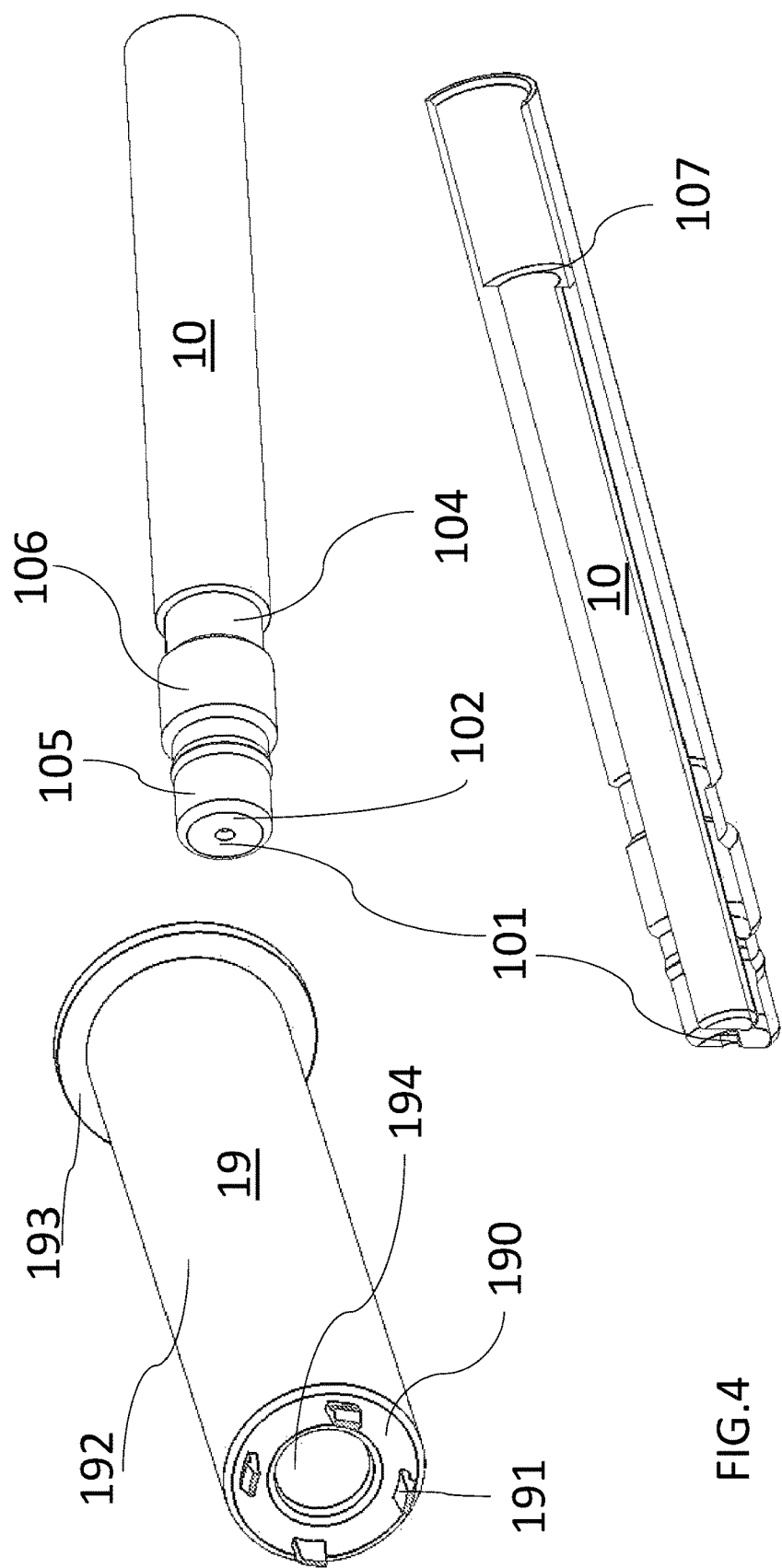
FIG. 4 shows perspective views of the training device demo container and hollow plunger. Additionally, a cross sectional view of the hollow plunger.

As seen in FIG. 4, the demo container 19 may comprise a tubular body 192 having a proximal and transversal circumferential surface 190, which is washer-shaped, and a distal annular flange 193. The proximal and transversal circumferential surface 190 has a central opening 194 and equidistant proximally protruding engagement protrusions 191 configured to fixedly connect the demo container to the inner surface of the elongated housing 2.

The stopper 13 is configured to slide longitudinally along the tubular inner body 192 of the demo container 19.

The hollow plunger 10, as illustrated in FIG. 4, may comprise a transversal circumferential surface 102 having the passage 101. The hollow plunger 10 further comprises on its outer surface an annular groove 104, a first proximal annular zone 105, and a second annular zone 106. The hollow plunger also comprises on in its inner surface a distal annular heel 107.

Figure 7:
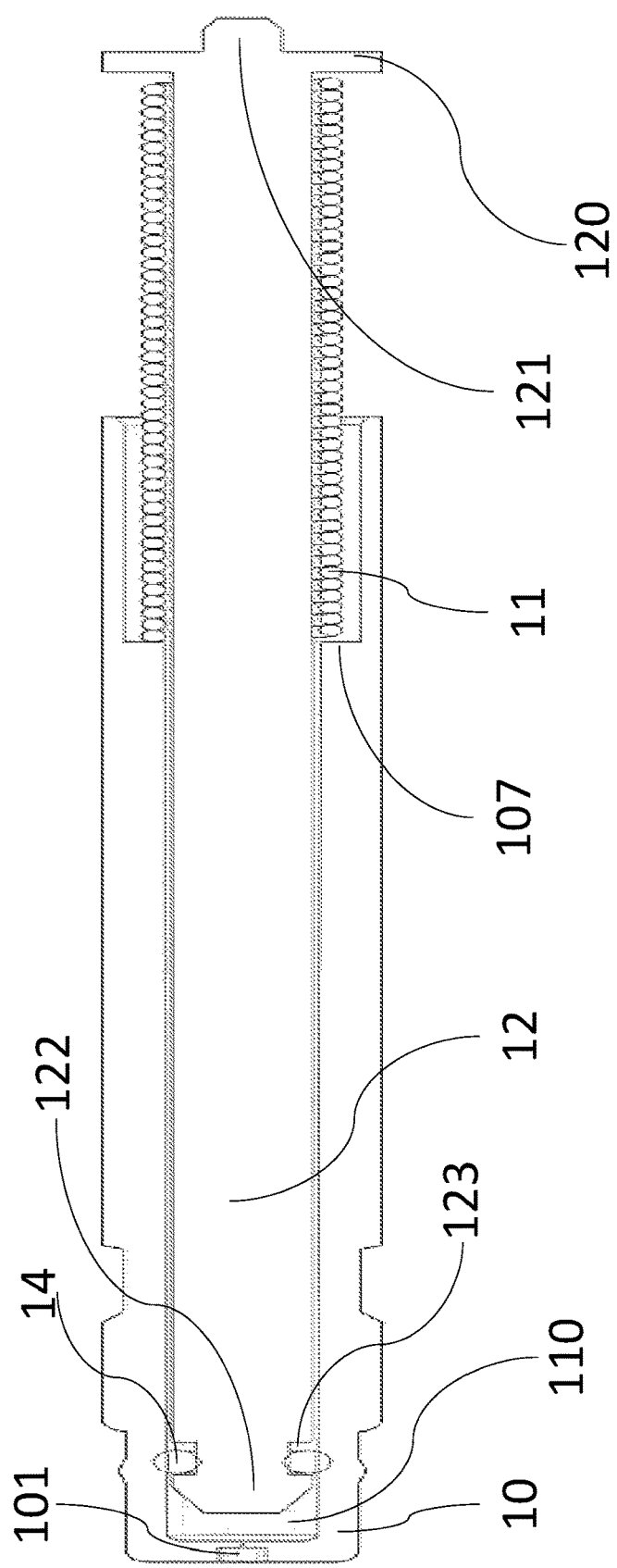
FIG. 7 shows side view of the reloadable plunger assembly according to an embodiment of the present disclosure, illustrating the first position of the hollow plunger.
Figure 8:
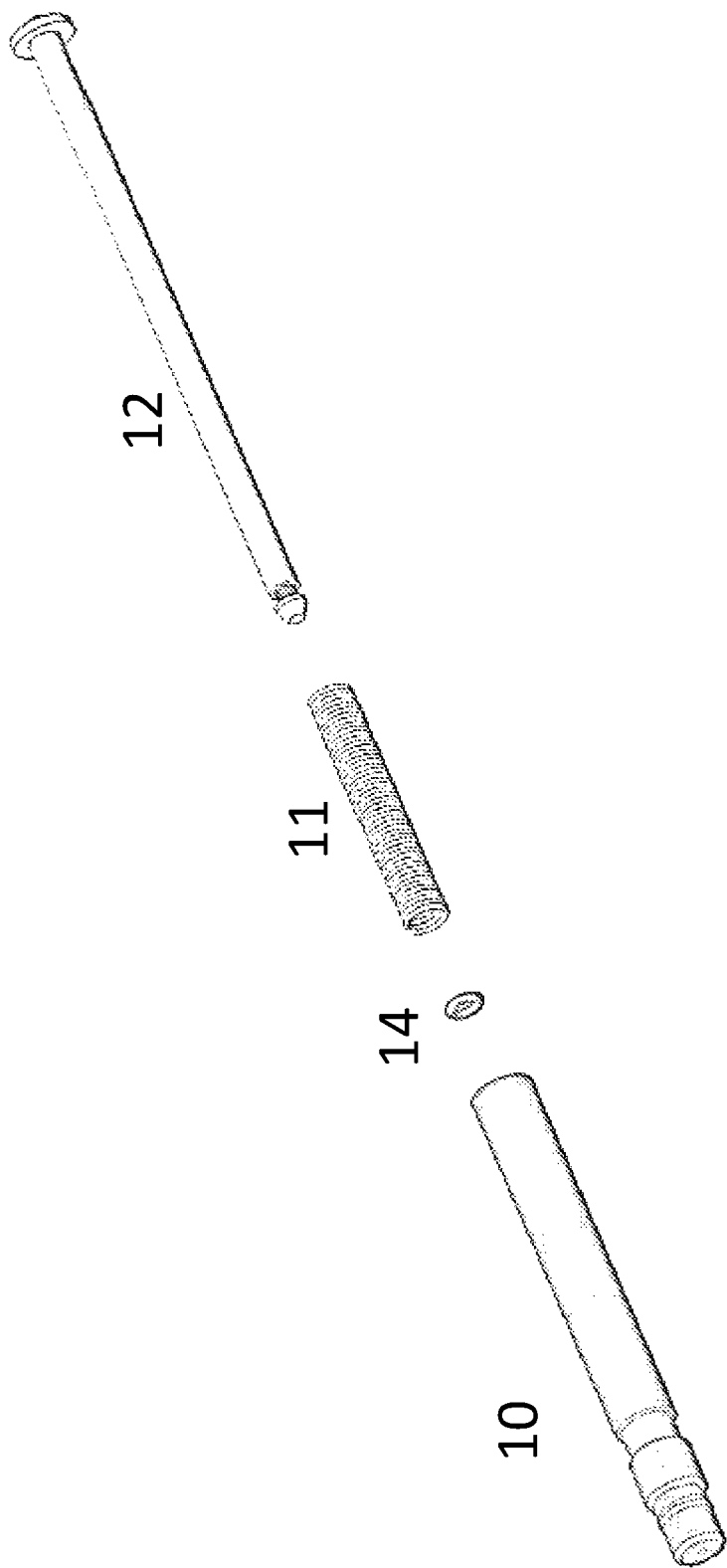
FIG. 8 illustrates an exploded perspective view of the reloadable plunger assembly according to FIG. 7.

The first energy accumulating member 11, which is a compression spring in the present embodiment, is arranged between the distal annular heel 107 of the hollow plunger 10 and a distal annular flange 120 of the piston rod 12 (FIG. 7).

Figure 6:
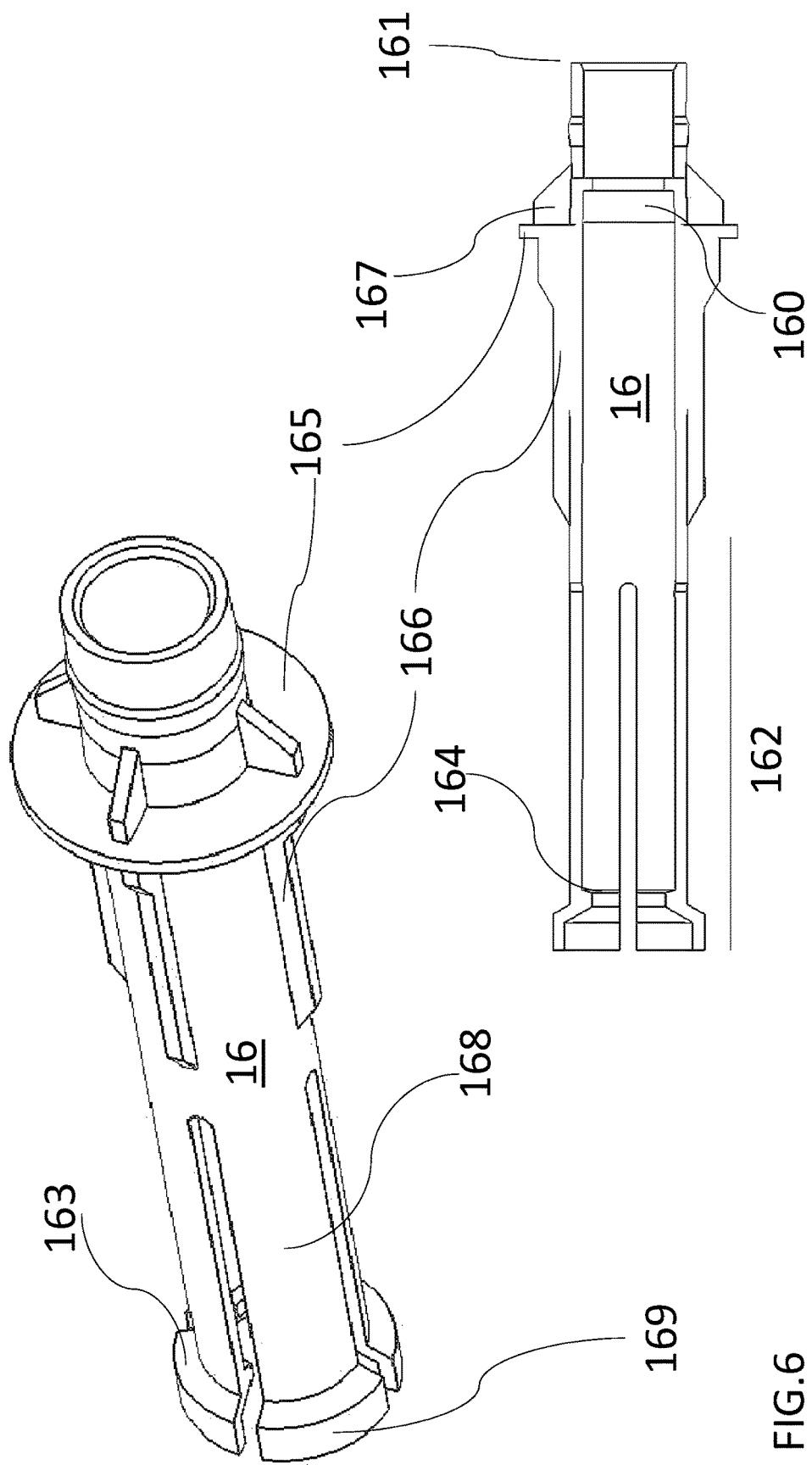
FIG. 6 shows a perspective view and a cross sectional view of the training device actuator.
Figure 11:
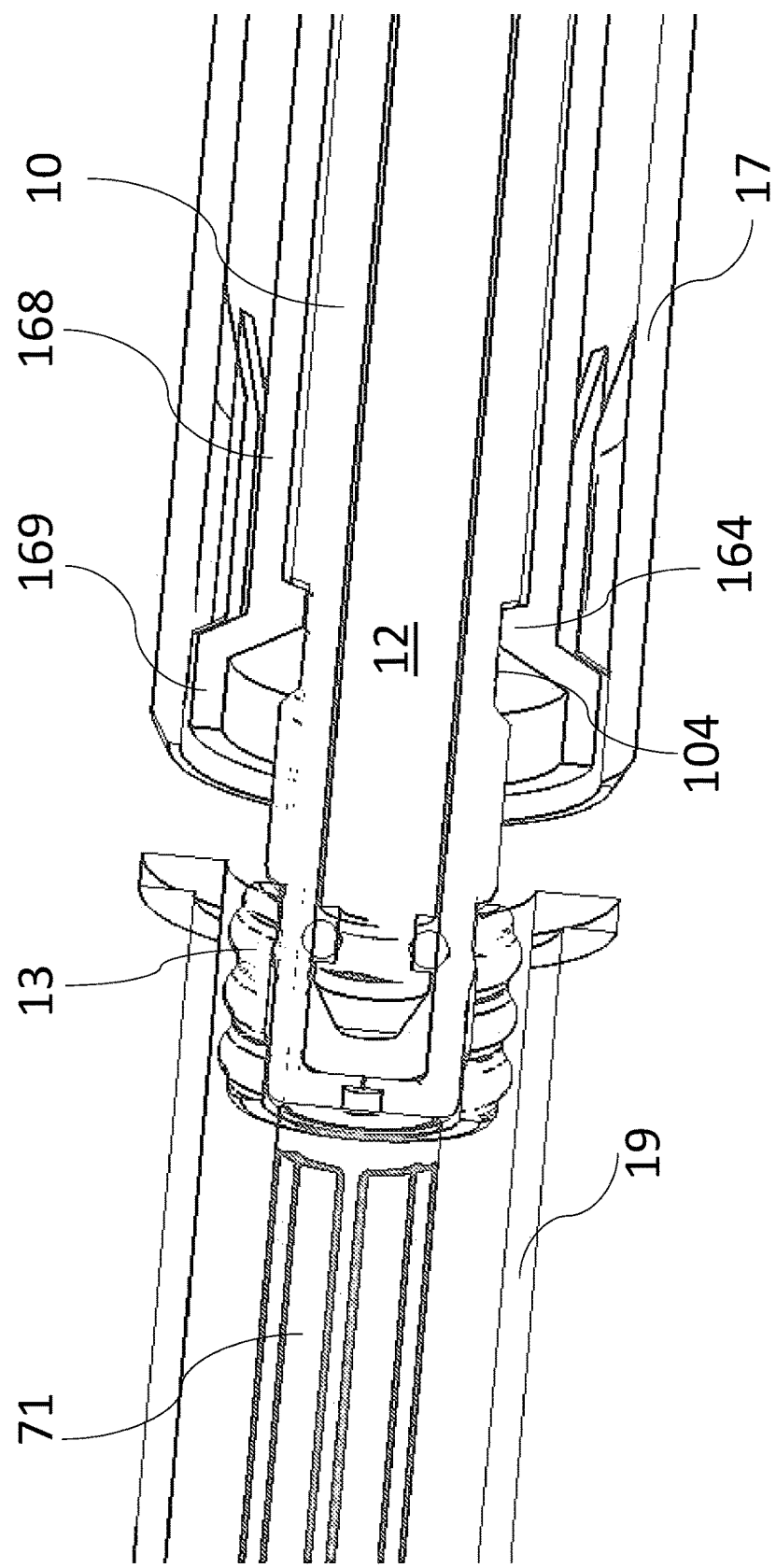
FIG. 11 shows an enlarged cross-sectional view of FIG. 9.
Figure 12:
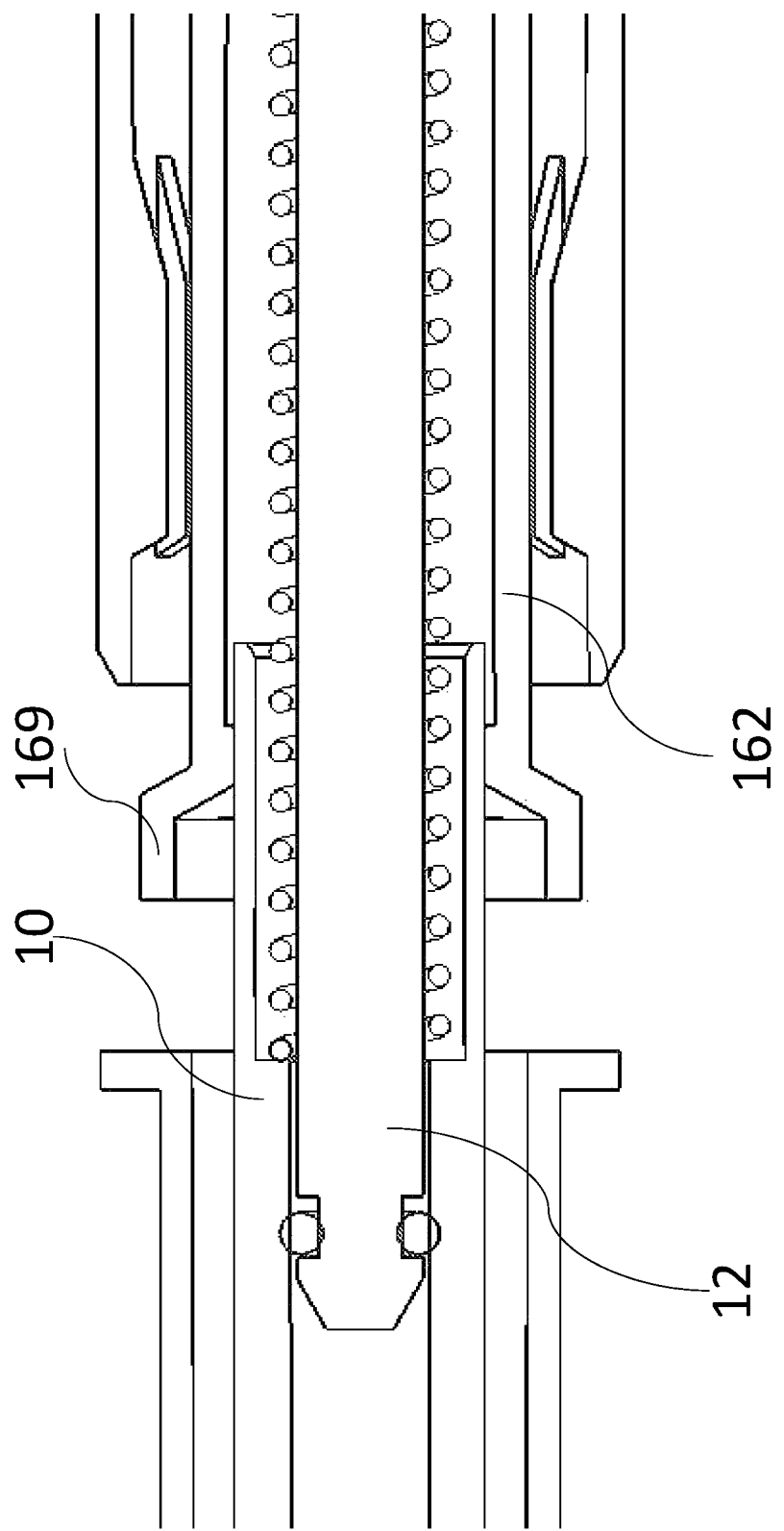
FIG. 12 shows an enlarged cross-sectional view of FIG. 10.

The stopper 13 is located coaxially on the first proximal annular zone 105 of the hollow plunger 10 as illustrated in FIG. 11. The annular groove 104 on the hollow plunger 10 is designed to receive an inner protrusion 164 of the actuator 16 (FIG. 6, 11). In other embodiments, the actuator 16 may be provided with an annular opening or recess instead of the inner protrusion 164 and the hollow plunger 10 may be provided with an annular ledge instead of the annular groove 104.

Figure 5:
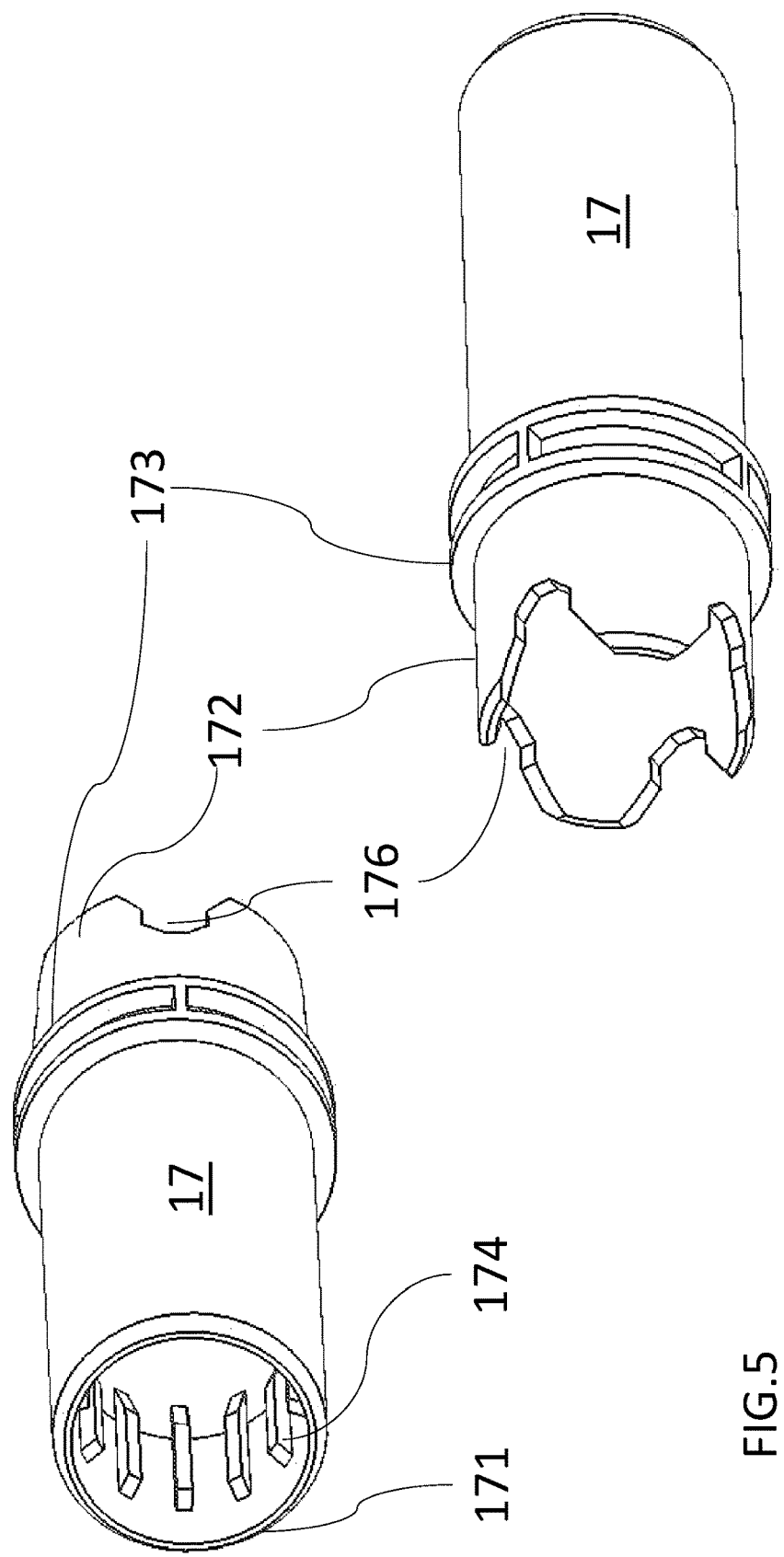
FIG. 5 illustrates proximal and distal perspective views of the training device actuator sleeve.

FIG. 5 shows perspective views of the actuator sleeve 17, wherein the actuator sleeve 17 may comprise a proximal end part 171, a distal end part 172, a collar 173 between the distal 172 and proximal 171 parts, inner equidistant longitudinally ribs 174 on the inner surface of the proximal end part 171 and cut-outs 176 by the distal end part 172.

FIG. 6 shows perspective views of the actuator 16. The actuator 16 may comprise a central opening extending along the longitudinal axis L and configured to receive the hollow plunger 10, a distal tubular portion 161, a resilient proximal portion 162 with a first segment 168 having a first outer diameter and a second segment 169 having a second outer diameter, the second segment 169 being more proximal than the first segment 168 and the second outer diameter being larger than the first outer diameter, a tapering segment 163 between the first segment 168 and the second segment 169, an inner protrusion 164, a collar 165, equidistant longitudinal wings 166, and equidistant longitudinal flaps 167. Further, as seen in FIGS. 2, 7, 9-10, the actuator 16 also comprises an annular ledge 160 which extends radially inwards from the inner tubular surface of the actuator 16.

Figure 9:
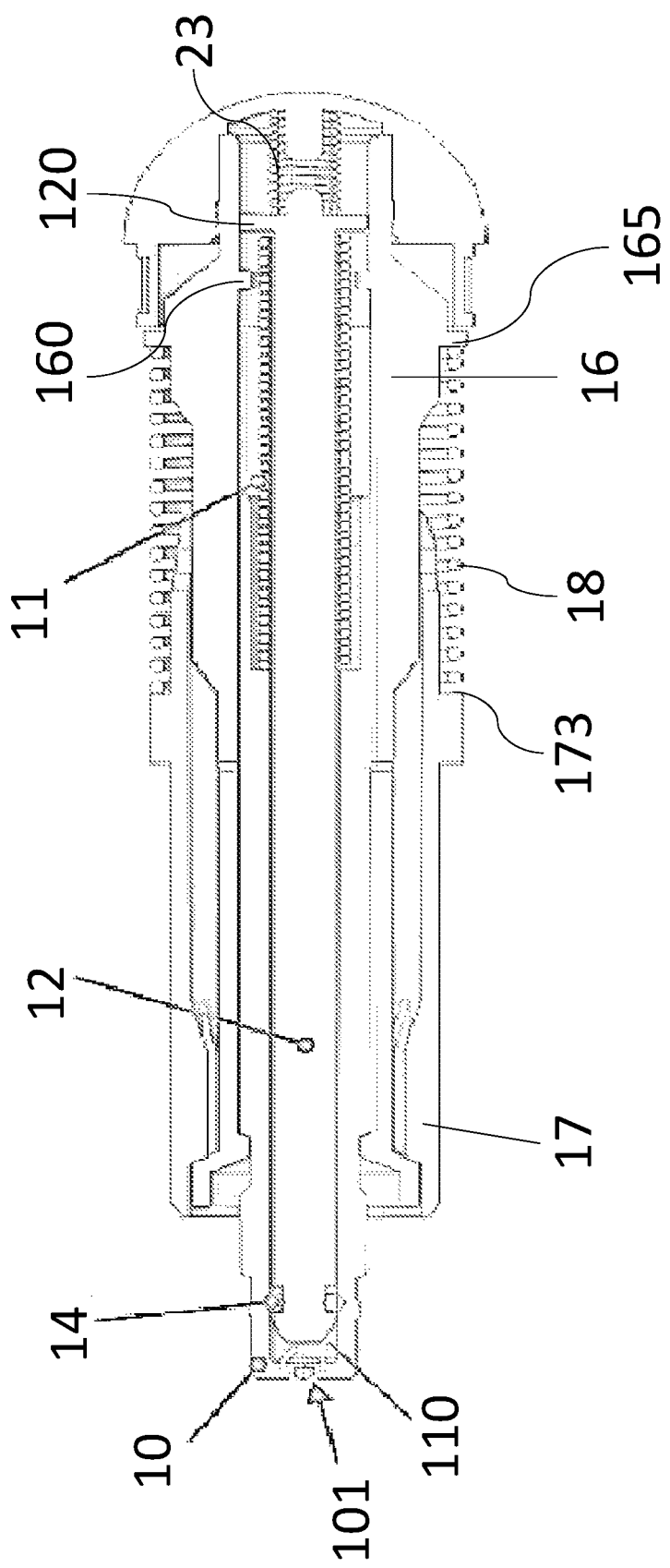
FIG. 9 illustrates a cross-sectional view of the reloadable plunger assembly arranged with the actuation assembly and the rear cap when the hollow plunger is in the first position.

The actuator sleeve 17 is coaxially arranged on the actuator 16, more particularly on a proximal portion of the actuator, a seen in FIG. 9. The actuator sleeve 17 overlaps at least part of the second segment 169 and inhibits the resilient portion 162 from moving in a radially outward direction when the actuator sleeve 17 is in the initial position.

Figure 10:
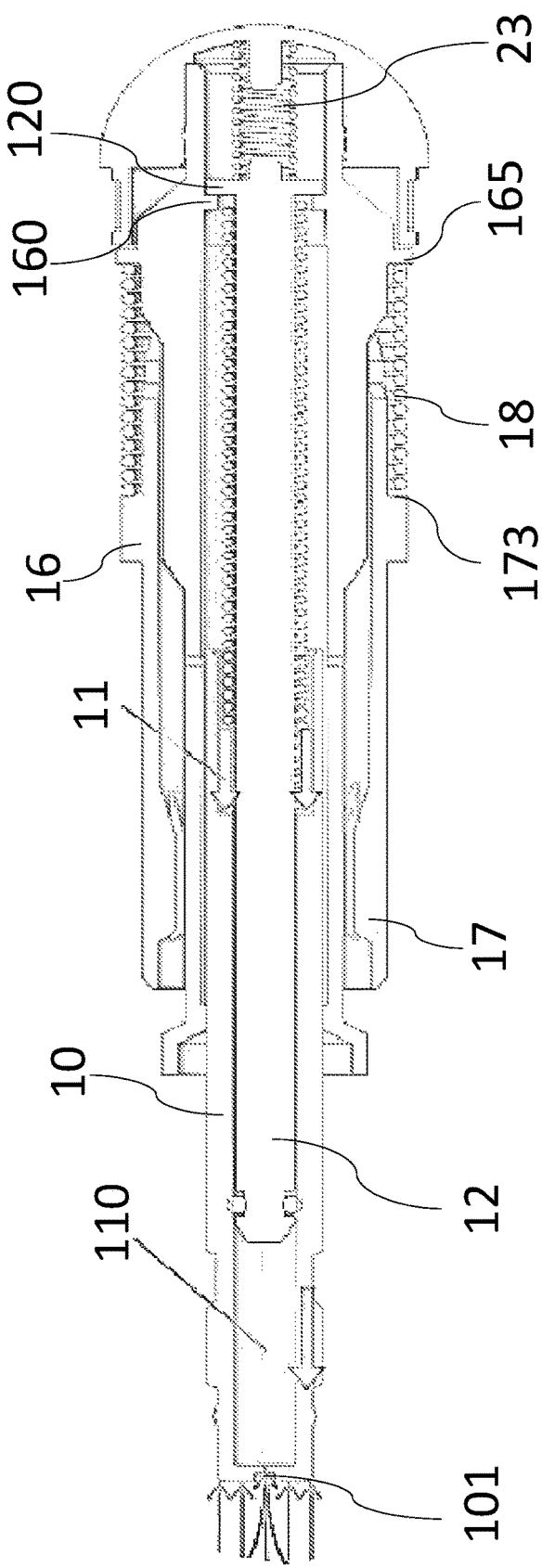
FIG. 10 illustrates a cross-sectional view of the reloadable plunger assembly arranged with the actuation assembly and the rear cap when the hollow plunger is in the second position compared to FIG. 9.

Further the actuator 16 is provided with the collar 165 wherein the equidistant longitudinal wings 166 run proximally from said collar 165. By the same token, the equidistant longitudinal flaps 167 runs distally from said collar 165. The third energy accumulating member 18 in the form of a compression spring is coaxially positioned between the collar 165 of the actuator 16 and the collar 173 of the actuator sleeve 17 creating an axial tension force between the actuator 16 and the actuator sleeve 17 (FIG. 9-10).

The distal end of the actuator 16 is axially and rotationally fixed to the distal cap 21 by suitable connecting members/means. More particularly, the distal tubular portion 161 of the actuator 16 docks outwardly to an inner sleeve of the distal cap 21.

The piston rod 12 may be a piston rod known in the art, preferably tubular e.g. cylindrical. A proximal portion of the piston rod is configured to be positioned co-axially within the hollow plunger 10 as seen in FIGS. 2, 7-10. A distal portion of the piston rod is configured to be positioned coaxially within a tubular distal part of the actuator 16 as seen in FIGS. 2, 9-10. The distal annular flange 120 of the piston rod 12 is positioned between the annular ledge 160 of the actuator 16 and the transversal inner surface of the distal cap 21. The seal member 14, which in the present embodiment is a seal ring, is radially fixed in an annular recess 123 arranged to a proximal part 122 of the piston rod 12. The piston rod 12 is associated with the first energy accumulating member 11 which is coaxially arranged around the distal end 121 of the piston rod 12 between the distal annular heel 107 of the hollow plunger 10 and a distal annular flange 120 of the piston rod 12 (FIG. 7).

The device further comprises a second energy member 23 arranged between the elongated housing assembly and the piston rod 12. As seen in FIGS. 2, 9-10; the second energy member 23 is arranged between a transversal inner surface of the distal cap 21 and the distal annular flange 120 of the piston rod 12.

The first 11, second 23, third 18 and fourth 25 energy accumulating members in the present embodiment are compression springs. The second energy accumulating member 23 is designed having a high spring constant in relation to the spring constant of the first energy accumulating member 11, such that when the hollow plunger 10 is released from the first position, the piston rod 12 moves from the start position to the final position by a force exerted from the second energy accumulating member 23 causing an impact between the distal annular flange 120 of the piston rod 12 and the annular ledge 160 of the actuator 16 to create an audible feedback signal. This is a simulated signal to the user of the training device, indicating that the injection has started. The final position of the piston rod 12 is thus defined by the distal annular flange 120 abutting the annular ledge 160 of the actuator 16. The start position is defined as the position of the piston rod 12 where the force of the first energy accumulating member 11 balances the force of the second energy accumulating member 23, before the release of the hollow plunger 10, such that the piston rod is held stationary as long as the hollow plunger is held stationary.

When the needle cover is pressed against a presumed injection site, the proximal portion of the needle cover moves within the proximal end of the elongated housing 2 whereby the fourth energy accumulating member 25 is compressed. The needle cover moves in a first step where it travels the predetermined distance between the distal end of the needle cover and the proximal end of the actuator sleeve 16 and in a second step wherein the distal end of the needle cover abuts the proximal end of the actuator sleeve 17, whereby the actuator sleeve is axially moved in relation to the elongated housing 2 towards the distal end from the initial position to the retracted position against the axial force from said third energy accumulating member 18. The cut-outs 176 of the actuator sleeve 17 start to interact with the actuator wings 166 of the actuator and the resilient portion 162 (i.e., the resilient arm of the actuator 16) will be bend radially outwards due to the output axial force from the first energy accumulating member 11 that acts on the hollow plunger 10 such that the inner protrusion 164 of the actuator 16 is disengaged from the annular groove 104 of the hollow plunger 10. Subsequently, the hollow plunger 10 moves in the proximal direction to the second position due to said output axial force from the first energy accumulating member 11 (see FIG. 11).

The movement of the hollow plunger 10 in the proximal direction from the first to the second position by the force exerted from the first energy accumulating member 11 causes an airflow into the chamber 110 through the passage 101 whereby the movement of the hollow plunger is retarded or damped in order to provide a realistic simulation of medicament delivery. Further, the movement of the hollow plunger 10 is damped by a damping force which is created by a pressure difference between the pressures in the chamber 110 and in the atmosphere when air starts to flow into the chamber 110. The passage 101 is configured to have a certain size such that the airflow is controlled and whereby the pressure difference is balanced. Also, the chamber 110 is configured to have a certain size for defining the stroke length of the hollow plunger.

When the needle cover is removed from the presumed injection site, the needle cover 6 is axially urged by the fourth energy accumulating member 25 towards the proximal end such that the proximal portion of the needle cover extends proximally from the proximal end of the elongated housing 2. Since the distal end outer surface of the hollow plunger is in contact with the inner protrusion 164 of the actuator 16, the resilient portion 162 is kept in the radially outwardly bent position such that the tapering segment 163 interacts with the proximal end of the actuator sleeve whereby the actuator sleeve is maintained in the retracted position.

The device 1 may be reloaded by introducing the shaft member 71 into the elongated housing 2 through the proximal opening of the needle cover 6 and the central opening 194 of the demo container 19 and start pushing the hollow plunger 10 towards the distal direction from the second position to the first position (FIG. 9)

The hollow plunger 10 and the shaft member 71 will be moved in the distal direction against the axial force of the the first energy accumulating member 11 until the inner protrusion 164 of the actuator 16 engages with the annular groove 104 of the hollow plunger 10 whereby the third energy accumulating member 18 will force the actuator sleeve 17 back into its initial position. Also, the first portion of the removable proximal cap 20 which has the cup-shaped structure guides and accommodates the proximal portion of the needle cover 6 that extends proximally of the elongated housing until the cup-shaped structure bears against the abutment surface of the elongated housing.

Furthermore, in the claims, the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be considered as limiting the scope.

It is however to be understood that embodiments described above and shown in the drawings are to be regarded only as non-limiting examples of the present disclosure and that may be modified within the scope of the appended patent claims.

The invention claimed is:

1. An automatic injection training device comprising:
an elongated housing assembly having a distal and an opposite proximal end;
a demo container axially and rotationally fixed relative to the elongated housing assembly;
characterized in that the device further comprises
a reloadable plunger assembly comprising a hollow plunger which is movable in the demo container between a first and a second position, a piston rod coaxially arranged within the hollow plunger and axially movable in relation to the elongated housing assembly between a start position and a final position, and a first energy accumulating member arranged between the hollow plunger and the piston rod;
an actuation assembly configured to hold the hollow plunger in a first position and thereby the piston rod in the start position and to release the hollow plunger from the first position and thereby the piston rod from the start position;
and wherein the hollow plunger comprises a chamber sealed by the piston rod, and a passage; such that movement of the hollow plunger from the first to the second position by a force exerted by the first energy accumulating member causes an airflow into the chamber through the passage whereby the movement of the hollow plunger is damped.

2. The automatic injection training device according to claim 1 wherein the movement of the hollow plunger is damped by a damping force which is created by a pressure difference between the pressures in the chamber and in the atmosphere when air starts to flow into the chamber.

3. The automatic injection training device according to claim 2 wherein the passage is configured to have a certain size such that the airflow is controlled and whereby the pressure difference is balanced.

4. The automatic injection training device according to claim 2 wherein the chamber is configured to have a certain size for defining the stroke length of the hollow plunger.

5. The automatic injection training device according to claim 1, wherein the device further comprises a second energy accumulating member arranged between the elongated housing assembly and the piston rod.

6. The automatic injection training device according to claim 5 wherein the first and the second energy accumulating members are compression springs and wherein the second energy accumulating member has a high spring constant in relation to the spring constant of the first energy accumulating member, such that when the hollow plunger is released from the first position, the piston rod moves from the start position to the final position by a force exerted from the second energy accumulating member causing an impact of the piston rod against a fixed surface to create an audible feedback signal.

7. The automatic injection training device according to claim 1, wherein the actuation assembly comprises an actuator sleeve that is slidably arranged in relation to the elongated housing and operationally associated with a third energy accumulating member such that, the actuator sleeve is axially moveable in relation to the elongated housing assembly towards the distal end from an initial position to a retracted position against an axial force from said third energy accumulating member.

8. The automatic injection training device according to claim 7, wherein the actuation assembly comprises an actuator; wherein the actuator has a resilient portion with a first segment having a first outer diameter and a second segment having a second outer diameter, the second segment being more proximal than the first segment and the second outer diameter being larger than the first outer diameter; and wherein the actuator sleeve overlaps at least part of the second segment and inhibits the resilient portion from moving radially outwards when the actuator sleeve is in the initial position.

9. The automatic injection training device according to claim 8, wherein the actuator further has a tapering segment between the first segment and the second segment.

10. The automatic injection training device according to claim 8, wherein the movement of the hollow plunger towards the proximal end of the device is substantially inhibited by the at least one resilient portion interacting with the hollow plunger, when the hollow plunger is in the first position and the actuator sleeve is in the initial position.

11. The automatic injection training device according to claim 8, wherein the resilient portion is designed to bend radially outwards such that the hollow plunger is released when the hollow plunger is in the first position and the actuator sleeve is in the retracted position.

12. The automatic injection training device according to claim 1, wherein the hollow plunger is axially moveable in relation to the elongated housing assembly and/or in relation to the piston rod towards the distal end from the second position to the first position against the axial force from the first energy accumulating member when the device is to be reloaded.

13. The automatic injection training device according to claim 1, wherein the actuation assembly further comprises a needle cover that is operationally associated with the actuator sleeve and has a proximal portion that extends proximally of the elongated housing assembly when the actuator sleeve is in the initial position.

14. The automatic injection training device according to claim 13, wherein the needle cover is connected to a fourth energy accumulating member that urges the needle cover to move proximally such that the proximal portion of the needle cover protrudes from the proximal end of the elongated housing assembly.

15. An assembly comprising an automatic injection training device according to claim 1 and a reload cap unit wherein the reload cap unit comprises a removable proximal cap having a shaft member that is configured for being introduced into the elongated housing assembly through a proximal opening of a needle cover.

16. The assembly according to claim 15 wherein the needle cover is operationally associated with the actuator sleeve and has a proximal portion that extends proximally of the elongated housing assembly when the actuator sleeve is in the initial position,
wherein the needle cover is connected to a fourth energy accumulating member that urges the needle cover to move proximally such that the proximal portion of the needle cover protrudes from the proximal end of the elongated housing assembly, and
wherein the removable proximal cap comprises a first portion with a cup-shaped structure that is configured to accommodate and/or guide the proximal portion of the needle cover that extends proximally of the elongated housing and which cup-shaped structure is configured to bear against an abutment surface of the elongated housing assembly when the device is reloaded.

* * * * *